United States Patent [19]

Gomi et al.

[11] Patent Number: 4,622,360
[45] Date of Patent: Nov. 11, 1986

[54] COATING COMPOSITION

[75] Inventors: Tadashi Gomi, Fussa; Kenji Sakata, Fujisawa; Ichiro Aoyama, Yokohama; Nobuo Sono, Tokyo, all of Japan

[73] Assignees: Yuho Chemicals Inc.; Mitsui Toatsu Chemical Inc., both of Tokyo, Japan

[21] Appl. No.: 795,435

[22] Filed: Nov. 6, 1985

[51] Int. Cl.⁴ ............................................ C08L 75/04
[52] U.S. Cl. .................................... 524/507; 427/154; 427/155; 524/539; 524/591; 524/871; 524/872; 524/873; 524/874; 524/875
[58] Field of Search ............... 524/507, 539, 591, 871, 524/872, 873, 874, 875; 427/154, 155

[56] References Cited

U.S. PATENT DOCUMENTS 4,172,191 10/1979 Nachtkamp et al. ............... 524/591
4,385,097  5/1983 Isozaki et al. ........................ 524/591
4,460,738  7/1984 Frentzel et al. ...................... 524/591
4,558,090 12/1985 Drexler et al. ....................... 524/591

Primary Examiner—Maurice J. Welsh
Attorney, Agent, or Firm—Oblon, Fisher, Spivak, McClelland, & Maier

[57] ABSTRACT

Removable water-borne urethane resin coating composition comprising polyurethane resin containing carboxyl groups and/or carboxylate groups and polyvalent metal complex as a cross-linking agent and method for removing the coating formed by using the removable water-borne urethane resin coating composition which comprises treating said coating with a ligand containing alkaline solution and removing the coating.

The coating formed by using the composition is superior in water resistance, recoatability, detergent resistance, black heel mark resistance, abrasion resistance and service life.

14 Claims, No Drawings

COATING COMPOSITION

BACKGROUND OF THE INVENTION

1. Field of the Invention

The present invention relates to a removable water-borne urethane resin coating composition. More particularly, it relates to a removable water-borne urethane resin coating composition containing a polyvalent metal complex as a cross-linking agent.

2. Description of the Prior Art

A coating composition is used to coat a floor or the like and, followed by drying or other necessary processing to form a coating on the floor so as to preserve the attractive appearance of the floor surface, to prevent the floor from being stained and to protect the flooring material. The coating composition can be applied to various flooring materials including wood and synthetic resin.

Floor coatings for wooden floor have been used for a long time. The most common coating composition, a solution of a wax ingredient such as paraffin wax or carnauba wax dissolved in turpentine oil, is applied to the wooden floor surface, dried to a semi-dry state and then wiped with a dry cloth. However, the coating composition mainly composed of a wax has a disadvantage that the durability of the resultant coating is not satisfactory.

In order to provide a floor coating material which overcomes the aforementioned disadvantage, various synthetic resins developed by recent advances in chemical technology are dissolved in a suitable solvent, such as a thinner or organic solvents, to form a floor coating material, examples of such synthetic resins being polystyrene, acrylic resins, polyvinyl chloride, polyesters, epoxy resins, and copolymers thereof.

Remarkable progress has also been made in the floor materials which are coated. In ten years beginning from 1955, wooden flooring used in houses and office buildings were replaced by chemical flooring materials, which now account for 90% or more of the floor materials in use today. However, since the main ingredients of chemical flooring materials are synthetic resins such as polyvinyl-asbestos resin, polyvinylchloride resin or asphalt, such flooring materials tend to be dissolved in a base solvent of the floor coating compositions such as petroleum or naphthene base solvents and thereby are deteriorated. Moreover, because petroleum or naphthene base solvents may be toxic to workers and are flammable, the floor coating compositions dissolved in organic solvents have been gradually replaced by water-emulsion compositions.

Thus, synthetic resin emulsion type coating compositions have developed from around 1960, with many improvements being made to styrene resin emulsions, styrene-acrylate copolymer resin emulsions and acrylate resin emulsions.

We have been investigating water-borne polyurethane resin coating composition with the aim of preparing a floor coating material having properties superior to those of the aforementioned emulsion type coating compositions, and have found that commercial water-borne polyurethane resins cannot be used directly as a floor coating compositions for the following reasons.

A floor surface coated with any composition, even a coating composition with superior durability, is inevitably galled, stained and abraded by the wear and tear of being walked on, and inevitably the coating surface is tinged with yellow or otherwise deteriorated with the lapse of time. In consideration of this, it becomes necessary to remove old coatings and apply a new coating in order to preserve the beautiful appearance or the floor and to protect the floor.

Although the coating formed by applying a commercial water-borne polyurethane resin on the floor surface, followed by complete curing is excellent in adhesiveness, gloss and toughness, it has the disadvantage that it is difficult to remove from the floor surface using chemical means. If such a coating is removed using a strong solvent, the chemical flooring material is also dissolved by the solvent. On the other hand, the flooring is damaged if the coating is removed by mechanical grinding.

We have therefore made various studies to prepare a coating composition having the properties itemized in the following (1) to (3) while maintaining the excellent properties of water-borne polyurethane resin.

(1) Easy to apply to a variety of materials, particularly on a floor, to form a coating which is tough and durable;

(2) Slight staining on the coating can be removed by the use of a weak alkaline cleaning agent;

(3) If the stains penetrate deep into the coating surface or the coating becomes yellowish with the lapse of time, the coating can be cleaned or removed by the use of a strong alkaline cleaning agent containing ammonia or an amine.

It has been found that the requirements set forth above are satisfied by the provision of a polyurethane resin containing carboxyl groups or carboxylate groups with the addition of a polyvalent metal complex as a metallic cross-linking agent. The present invention is based on the above finding.

SUMMARY OF THE INVENTION

Accordingly, the present invention relates to a removable water-borne urethane resin coating composition comprising a polyurethane resin containing carboxyl groups and/or carboxylate groups, and a polyvalent metal complex for acting as a cross-linking agent.

DETAILED DESCRIPTION OF THE INVENTION

The "polyurethane resin containing carboxyl groups and/or carboxylate groups" as used herein, means a polyurethane resin having a chain within which carboxyl groups and/or carboxylate groups are present. Such a resin may be prepared, for example, by adding diol components having a carboxyl group to the diol and diisocyanate component in the step of preparing the polyurethane resin, optionally followed by neutralization of the carboxyl groups, to allow them to polymerize.

By the introduction or carboxyl groups in a polyurethane resin, the resin may be modified to be water-dispersible or water-soluble so that a water-borne polyurethane resin may be prepared. Sometimes, an emulsifier may be added to the resin to form an aqueous emulsion.

Sometimes it is preferred that the base for forming the carboxylate in the resultant polyurethane resin be a relatively volatile material, such as amines or ammonia.

The amount of the carboxyl groups and/or carboxylate groups contained in the polyurethane resin may be indicated by the acid value. The acid value of the water-borne polyurethane resin, according to the present invention, ranges generally from 10 to 150, preferably from 30 to 150. The acid value, as herein used, means the quantity of KOH in mg required to neutralize 1 g of the solid resin. The cross linked coating of the coating composition containing a polyurethane resin having an acid value of less than 10 has poor removability.

On the contrary, the self-emulsification property and the solubility in water or the polyurethane resin having an acid value of more than 150 are as satisfactory as those having acid values of not more than 150. However, a coating composition containing such a polyurethane resin has inferior water resistance and resistance to cleaning. It suffices if the polyurethane resin blend has an acid value ranging from 10 to 150, and hence the use of a polyurethane resin having an acid value of less than 10 or more than 150 is included in the technical scope of the invention insofar the acid value of the blended composition satisfies the critical condition concerning the acid value.

Any water-borne polyurethane resin may be used in the present invention, irrespective of the molecular weight, molecular structure and preparation process. There is no restriction as to polymerization method and the presence or absence of a solvent as well as the kind of the solvent used at the step of polymerizing the prepolymer.

Water-borne polyurethane resins which may be used in the present invention, include copolymers or water-borne polyurethane resins with at least one vinyl monomer, such as acrylic acid, acrylates, methacrylic acid, methacrylates, vinyl chloride, styrene and vinyl acetate, and water-borne polyurethane resins obtained by the reaction of copolymers of said vinyl monomers with an water-borne polyurethane resin. It is, thus, intended that these coplymers are included in the scope of the invention.

A polymer resin may be added to the composition of the invention, other than the water-borne polyurethane resin, such as a synthetic resin emulsion or an alkali-soluble resin. Examples of a synthetic resin emulsion are emulsions of copolymers prepared by copolymerizing at least one vinyl monomer, such as acrylic acid, acrylates, methacrylic acid, methacrylates, styrene, $\alpha$-methylstyrene, vinyl chloride, vinyl acetate, ethylene and propylene. Representative examples of the alkali-soluble resin are styrene/maleic acid copolymer resins, rosin/maleic acid copolymer resins, water-soluble acrylic resins, water-soluble polyester resins and water-soluble epoxy resins.

The coating composition of the invention is prepared by adding a polyvalent metal complex to the aforementioned water-borne polyurethane resin.

The polyvalent metals included in the complex used in the present invention are metals each having a valency of two or more, examples being calcium, magnesium, zinc, barium, aluminium, zirconium, nickel, iron, cadmium, strontium, bismuth, berylium, cobalt, lead, copper and antimony. Particularly preferred are calcium, zinc and aluminium, since they provide preferable performance characteristics.

It is preferred that a polyvalent metal complex is used in an amount such that 0.05 to 1.0 chemical equivalent of the polyvalent metal is present per chemical equivalent of the carboxyl group and/or carboxylate group in the polyurethane resin.

Inorganic acids, organic acids, amino acids, ammonia and amines may be used as the ligends with which polyvalent metals form complexes, specific examples being oxalate ion, malate ion, hydroxyacetate ion, tartrate ion, acrylate ion, lactate ion, octonate ion, formate ion, salicylate ion, benzoate ion, gluconate ion, glutamate ion, glycine, alanine, ammonia, morpholine, ethylenediamine, dimethylaminoethanol, diethylaminoethanol, monoethanolamine, diethanolamine and triethanolamine.

Examples of the polyvalent metal complex which may be used in the invention to exhibit a favorable function are ammonium zinc carbonate, ammonium calcium ethylenediamine carbonate, ammonium zinc acetate, ammonium zinc acrylate, ammonium zinc malate, ammonium zirconium malate, ammonium zinc aminoacetate and ammonium calcium alanine.

The coating composition of the invention may be readily prepared by mixing and agitating an aqueous solution containing any of the aforementioned water-borne polyurethane resins with an aqueous solution of any of the aforementioned complexes of a polyvalent metal complexes at a normal temperature under a normal pressure.

It is essential in the present invention that the polyvalent metal forms a complex.

If a polyvalent metal which does not form a complex is added to the water-borne polyurethane resin containing carboxyl groups and/or carboxylate groups, for instance a hydroxide of a polyvalent metal is added, the carboxyl groups and/or carboxylate groups tend to be cross-linked by the action of such a polyvalent metal, causing various problems.

One of the problems is that the water-borne polyurethane resin becomes difficult to be emulsified in a stable condition or difficult to dissolves, leading to an increase in viscosity of the coating composition with the increase in loading on the applicator in the coating step, lowering the operation efficiency. Furthermore, the temperature required for the formation of a coating, i.e. the minimum coating formation temperature, is raised, resulting in the demerit that a continuous and uniform coating cannot be formed when the coating is applied at a low temperature. As a result, the applied coating is inferior in adhesiveness, gloss, water resistance, detergent resistance, service durability and leveling property.

In contrast thereto, since the coating composition of the invention contains a polyvalent metal acting as a cross-linking agent in the form of a complex, the water-borne polyurethane resin can be present in an extremely stable condition.

While it is not intended to be bound by theory, it is considered that the polyvalent metal forms a stable complex in the aqueous solution composed of a water-borne polyurethane resin and a complex of a polyvalent metal, according to the invention, so that the carboxyl groups are not cross-linked by the action of the polyvalent metal so as not to cause adverse increase in viscosity of the coating composition.

On the other hand, when the coating composition of the invention is applied to a floor surface, volatile matter evaporates spontaneously to allow the polyvalent metal ions to act on two or more carboxyl groups and/or carboxylate groups to initiate cross-linking reactions, whereby a tough coating membrane is formed.

To the coating composition of the present invention may be added a variety of additives, as desired.

For instance, when water-borne polyurethane resin having a minimum coating formation temperature higher than the normal temperature is used, it is preferred that a fusing agent or a plasticizer be added to the composition in order to facilitate formation of the coating film at room temperature. Examples of usable fusing agents or plasticizer include ethyleneglycol monomethyl ether, ethyleneglycol monoethyl ether, diethyleneglycol monomethyl ether, diethyleneglycol monoethyl ether, diethyleneglycol diethyl ether, N-methyl-2-pyrrolidone, dibutyl phthalate and tributoxyethyl phosphate.

However, it is not essential that a fusing agent or plasticizer be added to a water-borne polyurethane resin which can form a coating membrane at a room temperature.

An appropriate surface active agent may be added to the coating composition in order to improve the stability of the water-borne polyurethane resin or to improve the wettability thereof with respect to the floor material. Other additives, such as a slipping agent or leveling agent, may also be added to prevent the formation of black heel marks, if such improvement is required.

Although in the foregoing description the coating composition of the invention has been described as applied to the formation of a coating of a floor, it has a versatile utility which is not limited to the floor coating application. It may be applied to any other materials and used in many other places which require coating with a removable coating material. For example, the coating composition of the invention may be applied to the exterior and interior walls or a building.

The coating formed by using the composition of the present invention can be removed chemically, that is, the coating can be removed easily after treating the coating with a remover solution.

The remover solution usable in this invention is a alkaline solution containing ligand. The ligand is exemplified by ethylenediamine tetraacetic acid, N-hydroxyethylethylenediamine-N,N',N'-triacetic acid, diethylenetriamine pentaacetic acid, N,N,N',N'-tetrakis-(2-hydroxypropyl)-ethylenediamine, ethylenediamine-N,N'-diacetic acid, 1-hydroxyethylidene-1, 1-diphosphoric acid, triethylenetetramine-N,N',N'',N''',N''''-hexaacetic acid, cirtric acid, oxalic acid, gluconic acid, glycolic acid, malic acid, ammonia, monoethanolamine, diethanolamine, triethanolamine, morpholine, diethylaminoethanol, dimethylaminoethanol, ethylenediamine and others. The alkaline solution contains, for example, ammonia, amine, sodium hydroxide, potassium hydroxide, sodium methasilicate, sodium orthosilicate, potassium silicate, sodium pyrophosphate, potassium pyrophosphate, sodium triphosphate, potassium triphosphate and the like as an alkaline material.

The ligand containing alkaline solution may be added with a surface active agent such as an anionic (high alcohol sulfate, salts of fatty acid, alkylbenzene sulfonate, polyoxyethylene-ethersulfate and others), nonionic (polyoxyethylenealkylether, polyoxyethylenealkylphenolether, polyoxyethyleneacylether and others) and ampholytic (alkylbetaine and others) surface active agent so as to increase in adherability and dispersibility of the water-borne polyurethane resin coating.

The ligand containing alkaline solution may be added with a solvent such as an alcohol (ethylalcohol, ethylhexylalcohol, benzylalcohol, butylalcohol and the like), an ether (diethylcarbitol, diethylcellosolve, butylether and the like), an etheralcohol (isopropylcellosolve, carbitol, cellosolve, glycolether benzylcellosolve, methylcarbitol, methylcellosolve, triethyleneglycol-monoethylether and the like), an esterether (butyl acetate carbitol, butylacetatecellosolve, acetate carbitol, acetate cellosolve, 3-methoxybutyl-acetate, methyl acetate carbitol, methylacetatecellosolve and the like), a ketone (acetone, diethylketone, methyl-butyl ketone and the like), an ester (acetate, propionate and the like), N-methyl-2-pyrolidone, 2-pyrolidone, dimethylformamide, tetrahydrofurane, dimethylsulfoxide and others so as to increase the solubility of the water-borne polyurethane resin coating.

The present invention will be described more specifically by referring to some examples. Meanwhile, the "effective component" in the Examples and Comparative Examples is shown by the content (concentration) of each resin in % by weight units.

REFERENCE EXAMPLE 1: PREPARATION OF A POLYVALENT METAL COMPLEX AQUEOUS SOLUTION (1) Zinc carbonate ammonia aqueous solution:
Into a vessel equipped with an agitator was charged 54.0 g of water, to which was slowly added 10 g of zinc oxide under agitation to disperse the zinc oxide in the water. Then 18.0 g of 28% aqueous ammonia and 18.0 g of ammonium carbonate were serially stirred into the dispersed solution until dissolved, whereby there was obtained zinc carbonate ammonia aqueous solution.

(2) Calcium carbonate ethylenediamine aqueous solution:
Into a vessel equipped with an agitator was charged 60.3 g of water, to which was added 10 g of calcium oxide under stirring to disperse it into the water. Then 14.3 g of ammonium carbonate, 7.7 g of ethylenediamine and 7.7 g of 28% aqueous ammonia were serially added to and dissolved in the dispersed mixture under agitation, whereby there was obtained calcium carbonate ethylenediamine aqueous solution.

(3) Zinc acetate ammonia aqueous solution:
Into a vessel equipped with an agitator was charged 55 g of water, to which was added 15 g of zinc acetate under agitation to dissolve it in the water. Then 30 g of 28% aqueous ammonia was added to the resultant solution under agitation, whereby there was obtained homogenous zinc acetate ammonia aqueous solution.

(4) Zinc acrylate ammonia aqueous solution:
Into a vessel equipped with an agitator was charged 59.4 g of water to which was added 7.0 g of zinc oxide under agitation to disperse it into the water. After 12.6 g of acrylic acid was added to the dispersed solution to produce zinc acrylate, 21.0 g of 28% aqueous ammonia was added to the zinc acrylate solution under agitation, whereby there was obtained a homogeneous zinc acrylate ammonia aqueous solution.

(5) Zinc aminoacetate ammonia aqueous solution:
Into a vessel equipped with an agitator was charged 47.9 g of water, to which was added 10.0 g of zinc oxide under agitation to disperse it into the water. After 23.6 g of 28% aqueous ammonia was added to the dispersed solution, 18.5 g of aminoacetic acid was added under agitation, whereby there was obtained zinc aminoacetate ammonia aqueous solution.

(6) Calcium alanine ammonia aqueous solution:
Into a vessel equipped with an agitator was charged 57.4 g of water, to which was added .5.0 g of calcium oxide under agitation to disperse it into the water. Then 21.7 g of 28% aqueous ammonia and 15.9 g of alanine were serially added to the dispersed solution under agitation whereby there was obtained a homogenous alanine calcium ammonia aqueous solution.

(7) Zirconium malate ammonia aqueous solution:

Into a vessel equipped with an agitator was charged 74.1 g of water, to which was added 5.0 g of zirconium oxide under agitation to disperse it into the water. After 10.9 g of malic acid was added to the dispersed solution to obtain zirconium malate aqueous solution, 10.0 g of 28% aqueous ammonia was added to said solution under agitation, whereby there was obtained a homogenous zirconium malate ammonia aqueous solution.

(8) Zinc malate ammonia aqueous solution:

Into a vessel equipped with an agitator was charged 43.5 g of water, to which was added 10.0 g of zinc oxide under agitation to disperse it into the water. After 16.5 g of malic acid was added to the dispersed solution to obtain zinc malate aqueous solution, 30.0 g of 28% aqueous ammonia was added to the solution under agitation, whereby there was obtained zinc malate ammonia aqueous solution.

TABLE 1

| Raw materials | Polyvolent metal complex Complex* | | | | | | | |
|---|---|---|---|---|---|---|---|---|
| | 1 | 2 | 3 | 4 | 5 | 6 | 7 | 8 |
| zinc oxide | 10.0 | | | 7.0 | 10.0 | | | 10.0 |
| calcium oxide | | 10.0 | | | | 5.0 | | |
| zirconium oxide | | | | | | | 5.0 | |
| zinc acetate | | | 15.0 | | | | | |
| acrylic acid | | | | 12.6 | | | | |
| aminoacetic acid | | | | | 18.5 | | | |
| malic acid | | | | | | | 10.9 | 16.5 |
| alanine | | | | | | 15.9 | | |
| 28% aqueous ammonia | 18.0 | 7.7 | 30.0 | 21.0 | 23.6 | 21.7 | 10.0 | 30.0 |
| ethylenediamine | | 7.7 | | | | | | |
| ammonium carbonate | 18.0 | 14.3 | | | | | | |
| water | 54.0 | 60.3 | 55.0 | 59.4 | 47.9 | 57.4 | 74.1 | 43.5 |

(unit: parts per weight)

*1 Zinc carbonate ammonia (containing 8.03% of zinc)
2 Calcium carbonate ethylenediamine ammonia (containing 7.14% of calcium)
3 Zinc acetate ammonia (containing 5.36% of zinc)
4 Zinc acrylate ammonia (containing 5.62% of zinc)
5 Zinc aminoacetate ammonia (containing 8.03% of zinc)
6 Calcium alanine ammonia (containing 3.57% of calcium)
7 Zirconium malate ammonia (containing 3.70% of zirconium)
8 Zinc malate ammonia (containing 8.03% of zinc)

REFERENCE EXAMPLE 2: PREPARATION OF WATER-BORNE POLYURETHANE RESIN (1) 80 g of polytetramethyleneetherglycol (molecular weight: 1000), 143.7 g of isophoronediisocyanate, 64.4 g of dimethylol propionic acid and 163.3 g of N-methylpyrolidone were charged into a reactor equipped with a reflux condenser, a thermometer and an agitator and urethanization reaction was conducted with the reaction temperature maintained at 80° to 100° C. to prepare a prepolymer. After the prepolymer was neutralized by adding 46.7 g of triethylaime, 11.9 g of hexamethylenediamine was added to the prepolymer and polymerization reaction was conducted by slowly adding 490.0 g of distilled water while maintaining the reactor temperature at less than 35° C. As a result, there was obtained water-borne polyurethane resin A.

Acid value per solid of the water-borne polyurethane resin was 90.0.

(2) Water-borne polyurethane resin B and C were prepared in accordance with the procedure of (1) above except that the raw materials shown in table 2 were used.

Acid values (per solid) of the polyurethane resin B and C were respectively 30.0 and 20.0.

TABLE 2

| Raw materials | Resin | | |
|---|---|---|---|
| | A | B | C |
| polytetramethyleneetherglycol (molecular weight: 1000) | 80.0 | — | 186.6 |
| OLESTER Q-5001E* | | 158.2 | |
| dimethylolpropionic acid | 64.4 | 20.7 | 14.3 |
| isophoronediisocyanate | 143.7 | — | 87.2 |
| dicyclohexylmethane diisocyanate | — | 109.2 | — |
| hexamethylene diamine | 11.9 | 11.9 | 11.9 |
| triethylamine | 46.7 | 15.6 | 10.4 |
| N—methylpyrolidone | 163.3 | 171.1 | — |
| methylethylketone | — | — | 172.4 |
| distilled water | 490.0 | 513.3 | 517.2 |
| total | 1,000.0 | 1,000.0 | 1,000.0 |
| acid value per solid of resin | 90.0 | 30.0 | 20.0 |

(unit: parts per weight)

*OLESTER Q-5001E is a trademark for polyesterpolyol (MW: 1000) produced by Mitsui Toatsu Chemicals, Inc. of Japan.

EXAMPLES 1 TO 15

Compositions of the present invention (examples 1 to 15) were obtained by mixing polyvalent metal complex aqueous solution, water-borne polyurethane resin the preparation method for which was shown in reference examples 1 and 2, additives such as diethyleneglycolmonoethylene ether and others, and water in accordance with the compound ratio shown in table 3.

Various performance assessments (storage stability, gloss, water resistance, removability, detergent resistance, leveling, recoatability, black heel mark resistance, abrasion resistance and service durability) of the compositions obtained (Examples 1 to 15) were conducted. The results were as shown in table 4.

COMPARATIVE EXAMPLES (1 TO 5)

Compositions not containing polyvalent metal complex (comparative examples 1 and 5) and compositions not containing water-borne polyurethane resin (comparative examples 2 to 4) were prepared by mixing compound raw materials in accordance with the compound ratio shown in table 3.

Performance assessment of the compositions obtained was conducted and the results were as shown in table 4.

TABLE 3

| Compound of Composition | | | | | | | | | | |
|---|---|---|---|---|---|---|---|---|---|---|
| | Examples | | | | | | | | | |
| | 1 | 2 | 3 | 4 | 5 | 6 | 7 | 8 | 9 | 10 |
| water-borne polyurethane resin (R1) | 56.7 | 51.0 | 39.7 | | | | 28.3 | | 11.3 | 17.0 |
| water-borne polyurethane resin (R2) | | | | 56.7 | 48.2 | 28.3 | | 28.3 | | |
| water-borne polyurethane resin (R3) | | | | | | | 22.7 | 22.7 | 22.7 | 39.7 |
| acryl resin emulsion (R4) | | | | | | 8.5 | | | 12.8 | |
| acryl resin emulsion (R5) | | | 8.5 | | 8.5 | | | | | |
| oxidized type polyurethane wax (R6) emulsion | | 3.4 | 6.8 | | 6.8 | 3.4 | 3.4 | 3.4 | | 6.8 |

TABLE 3-continued

| Compound of Composition | | | | | | | | | | |
|---|---|---|---|---|---|---|---|---|---|---|
| stylene-maleic acid copolymer (R7) aqueous solution | | 5.0 | | | 5.0 | 5.0 | 5.0 | 5.0 | | |
| zinc carbonate ammonia (R8) | 4.44 | | | 1.48 | | | | 0.51 | 1.90 | |
| calcium carbonate ethylenediamine (R8) ammonia | | | | | | 1.34 | | | | |
| zinc acetate ammonia (R8) | | 3.43 | | | 0.94 | | | | | |
| zinc acrylate ammonia (R8) | | | 3.65 | | | | | 3.56 | | |
| zinc aminoacetate ammonia (R8) | | | | | | | | | | |
| zinc malate ammonia (R8) | | | | | | | | | | 0.73 |
| diethylene glycolmonoethylether | 4.5 | 4.0 | 4.5 | 3.0 | 2.5 | 2.7 | 4.0 | 3.0 | 3.5 | 4.5 |
| tributoxyethyl phosphate | 1.2 | 1.2 | 1.2 | 1.2 | 1.2 | 1.2 | 1.2 | 1.2 | 1.2 | 1.2 |
| anionic carbon fluoride surface-active agent | 0.006 | 0.006 | 0.006 | 0.006 | 0.006 | 0.006 | 0.006 | 0.006 | 0.006 | 0.006 |
| water | 33,154 | 31,964 | 35,644 | 37,614 | 35,354 | 41,054 | 31,834 | 35,884 | 39,794 | |
| chemical equivalent | 0.40 | 0.20 | 0.30 | 0.40 | 0.20 | 0.30 | 0.40 | 0.20 | 0.30 | 0.10 |

| | Examples | | | | | Comparative Examples | | | | |
|---|---|---|---|---|---|---|---|---|---|---|
| | 11 | 12 | 13 | 14 | 15 | 1 | 2 | 3 | 4 | 5 |
| water-borne polyurethane resin (R1) | 56.7 | | | 51.0 | | 56.7 | | | | |
| water-borne polyurethane resin (R2) | | 56.7 | | | 51.0 | | | | | |
| water-borne polyurethane resin (R3) | | | 56.7 | | | | | | 28.3 | |
| acryl resin emulsion (R4) | | | | | | | 36.1 | 19.1 | | |
| acryl resin emulsion (R5) | | | | | | | | 19.1 | 34.0 | 17.0 |
| oxidized type polyurethane wax (R6) emulsion | | | | | 6.8 | | 6.8 | 3.4 | 6.8 | 6.8 |
| stylene-maleic acid copolymer (R7) aqueous solution | | | | 10 | | | 5.0 | 5.0 | 10.0 | |
| zinc carbonate ammonia (R8) | | | | | | | 2.73 | | | |
| calcium carbonate ethylenediamine (R8) ammonia | | | | | | | | | | |
| zinc acetate ammonia (R8) | | | | | | | | 1.42 | | |
| zinc acrylate ammonia (R8) | | | | | | | | | | |
| zinc aminoacetate ammonia (R8) | 4.44 | 0.375 | | 10.01 | | | | | | |
| zinc malate ammonia (R8) | | 0.375 | 1.00 | | 1.77 | | | | | |
| diethylene glycolmonoethylether | 5.0 | 5.5 | — | 4.0 | 2.5 | 4.5 | 4.5 | 4.5 | 4.5 | 4.0 |
| tributoxyethyl phosphate | 0.5 | — | 2.3 | 1.2 | 1.4 | 1.2 | 1.2 | 1.2 | 1.2 | 1.2 |
| anionic carbon fluoride surface-active agent | 0.010 | 0.05 | 0.006 | 0.006 | 0.05 | 0.006 | 0.006 | 0.006 | 0.006 | 0.006 |
| water | 33,350 | 37,000 | 39,994. | 23,784 | 36,400 | 37,594 | 43,664 | 46,274 | 43,494 | 42,694 |
| chemical equivalent | 0.40 | 0.20 | 0.40 | 1.00 | 0.2 | | 0.40 | 0.20 | | |

R1: water-borne polyurethane resin shown in table 2(A) (acid value: 90, active ingredient: 30%)
R2: water-borne polyurethane resin shown in table 2(B) (acid value: 30, active ingredient: 30%)
R3: water-borne polyurethane resin shown in table 2(C) (acid value: 20, active ingredient: 30%)
R4: polyacryl resin emulsion obtained by the conventional emulsion polymerization using sodium lauryl benzene sulfonate and comprising methacrylic acid 10%, butylacrylate 30% and methylmethacrylate 60% of monomer composition (acid value: 65, active ingredient: 40%)
R5: polyacryl resin emulsion obtained by the conventional emulsion polymerization using sodium lauryl benzene sulfonate and comprising metharylic acid 3%, buthyl acrylate 40% and methyl methacrylate 57% of monomer composition (acid value: 20, active ingredient: 40%)
R6: polyethylene wax emulsion (active ingredient: 25%) obtained by emulsifying oxidized polyethylene wax produced by Allied Chemical Corporation U.S.A. (trademark: AC-629; acid value 16, softening point: 104° C., penetration: 5.5 (ASTM D5)) withnon-ionic surface-active agent.
R7: aqueous solution (active ingredient: 17%) obtained by dissolving stylene - maleic acid copolymer resin produced by Arco Chemical Corporation (trademark: SMA 2625; acid value: 220, molecular weight: 1900) in aqueous ammonia.
R8: polyvalent metal complex aqueous solution shown in table 1.
R9: chemical equivalent of polyvalent metal in polyvalent metal complex relative to carbonic acid groups.

TABLE 4

| | Result of the Performance Assessment | | | | | | | | | | | | | | | | | | | |
|---|---|---|---|---|---|---|---|---|---|---|---|---|---|---|---|---|---|---|---|---|
| | Examples | | | | | | | | | | | | | | | Comparative Examples | | | | |
| Performance | 1 | 2 | 3 | 4 | 5 | 6 | 7 | 8 | 9 | 10 | 11 | 12 | 13 | 14 | 15 | 1 | 2 | 3 | 4 | 5 |
| storage stability | A | A | A | A | A | A | A | A | A | A | A | A | A | A | A | A | A | A | A | A |
| gloss (remark 1) | 83 | 71 | 78 | 86 | 76 | 84 | 82 | 77 | 83 | 71 | 85 | 88 | 88 | 78 | 73 | 52 | 78 | 72 | 61 | 56 |
| Water resistance | A | B | A | A | B | A | A | B | A | C | A | A | A | B | A-B | D | C | C | D | C-D |
| removability | A | A | A | A | A | A | A | A | A | A | A | A | A | A | A | A | A | A | A | A |
| detergent resistance | A | B | A-B | A | B | A | A | B | A | B-C | A | A | A | B | A-B | D | B | B-C | D | D |
| leveling | A | A | A | A | A | A | A | A | A | A | A | B | A | A | A | A | A | A | A | A |
| recoatability | A | B | A-B | A | A-B | A | A | A-B | A | B | A | A | A | B | A | D | A | A | C | D |
| black heel mark resistance | A | A | B | A | A | B | A | A-B | A-B | A-B | A | A | A | A-B | A | B-C | C | C | C-D | B-C |
| abrasion resistance | A | A-B | A | A | A-B | A-B | A | A | A | A-B | A | A | A | A-B | A | C | D | D | D | C-D |
| service durability | A | A-B | B | A | A-B | A | A | A-B | A | B | A | A | A | A-B | A | C | C-D | C-D | D | C |

A: excellent
B: good
C: fair
D: poor
remark 1: gloss of film obtained by coating compositions three times (%)

METHOD OF PERFORMANCE TEST AND COMPARISON OF PERFORMANCE ASSESSMENT

Test methods for floor coating material 1 to 5 were conducted in accordance with JFPA (Japan Floor Polish Association) Standard.

When the test method for the performance test was not defined in the Standard (leveling, recoatability, black heel mark resistance, abrasion resistance and service durability), the tests were conducted by following methods:

1. Storage stability

Approximately 100 ml of the sample was charged into a colorless cylindrical bottle having a volume of about 120 ml and sealed therein. After storage in a constant temperature bath of a temperature of 45° C.±2° C. for 24 hours, separation of phases was investigated.

2. Gloss

The sample was coated on a standard tile for the JFPA standard test in the amount of 10 ml±2 ml/m². After drying the coated tile at room temperature for 30 minutes, the gloss was measured. In accordance with a similar procedure, gloss of a twice coated tile and a three times coated tile were measured. The gloss measuring instrument was based upon JIS-Z8741 and the incidence angle was 60°.

3. Water resistance

A test piece obtained by coating a sample in accordance with the procedure of 2 (gloss) was stored in a constant temperature vessel maintained at less than 80% of humidity at room temperature for 24 hours. Then the test piece was placed on a horizontal fixed table at 23° C.±1.0° C., 0.1 ml of distilled water was dropped thereon, whereafter the test piece was covered with a cover glass and left to stand for 30 minutes.

After removing the water and leaving the test piece to stand for one hour, the degree of whitening was judged by the naked eye.

4. Removability

The test piece obtained by coating with the sample in accordance with the procedure described in 2 above (gloss) was maintained in a constant temperature vessel at 38° C.±2° C. for 6 hours, distilled water was dropped thereon at room temperature for one hour and the test piece was maintained in a constant temperature vessel at 38° C.±2° C. or 18 hours. A washing solution obtained by dissolving 3.97 g of potassium hydroxide (KOH: 85%) and 17.7 g of oleic acid in 1000 ml of distilled water containing 5 ml of aqueous ammonia (NH$_3$:28%) was used as a remover solution. After immersing a swine bristle brush for a gardner straightline washability tester into the remover solution for 2 minutes, 10±2 ml of the remover water was poured on the coating on the test piece and the coating was scrubbed for 25 cycles. After rinsing the test piece with clean water, the removability was judged by whether or not the coating had been removed thoroughly. The washability tester was based upon ASTM-D-1792-66.

5. Detergent resistance

The test piece obtained by coating with the sample in accordance with the procedure described in 2 above (gloss) was placed in a constant temperature vessel at 38±2° C. for 18 hours. A solution obtained by dissolving 0.1 g of sodium dodecylbenzenesulfonate and 0.2 g of sodium tripolyphosphate in 200 ml of distilled water (pH=9.0±0.2) was used as a washing solution. After immersing a swine bristle brush for a gardner straightline washability tester into the washing solution for 2 minutes, 10±2 ml of the washing solution was poured on a coating on the test piece and the coating was scrubbed 100 cycles. After rinsing the test piece with clean water and drying it, judgment was made in accordance with ASTM-D-3207-73.

6. Leveling and Recoatability

The leveling of the test piece obtained by coating with the sample in accordance with the procedure described in 2 (measurement of gloss) was judged by the naked eye.

The recoatability was judged by observing with the naked eye whether or not the coating on the test piece was reemulsified by the second coating.

7. Black heel mark resistance

After coating a white tile for JFPA Standard test with the sample in accordance with a procedure described in 2 above (gloss) and drying it at room temperature for 24 hours, the test piece was fixed with a screw on a holding site in the Snell Accelerated Soiling Capsule. Then the Capsule, containing six black rubber cubes (30×30 mm), was rotated at 50 rpm for 2.5 minutes in each direction. The black heel mark resistance was estimated by observing the percent of the tile surface that was covered by black marks with the naked eye.

8. Abrasion resistance

The abrasion resistance of the test piece obtained by coating with the sample five times in accordance with a procedure described in 2 (measurement of the gloss) and drying it at room temperature for 168 hours was measured by a T bar tester and judged.

9. Service life

The service life was judge synthetically on the basis of the water resistance, the abrasion resistance and the black heel mark resistance.

Compositions of the invention exhibited excellent performance for every assessment as shown in FIG. 4.

Especially, the crosslinking with the polyvalent metal was effective in enhancing water resistance, recoatability, detergent resistance, black heel mark resistance, abrasion resistance and service durability as compared with Example 1 and Comparative Example 1.

When comparing the compositions of the invention (water-borne polyurethane resin was used) and compositions of the comparative examples 2 to 4 (coating agent comprising acryl resin emulsion as main raw material), the compositions of the present invention were found to be superior in water resistance, recoatability, detergent resistance, black heel mark resistance, abrasion resistance and service life.

We claim:

1. Removable water-borne urethane resin coating composition comprising polyurethane resin containing carboxyl groups and/or carboxylate groups and polyvalent metal complex as a cross-linking agent.

2. Composition of claim 1 wherein the acid value of said polyurethane resin is 10 to 150.

3. Composition of claim 1 wherein said carboxylate group contained in the polyurethane resin is at least one selected from the group consisting of amine, ammonium and alkaline metal carboxylate.

4. Composition of claim 1 wherein the chemical equivalent of said polyvalent metal complex relative to the carboxyl groups and/or the carboxylate groups is 0.05 to 1.0.

5. Composition of claim 1 wherein the polyvalent metal in the complex is at least one selected from the group consisting of calcium, magnesium, zinc, barium, aluminium, zirconium, nickel, iron, cadminium, strontium, bismuth, beryllium, cobalt, lead, copper and antimony.

6. Composition of claim 1 wherein the ligand for forming the polyvalent metal complex is at least one selected from the group consisting of carbonic acid ion, acetic acid ion, oxalic acid ion, malic acid ion, hydroxyacetic acid ion, tartaric acid, acrylic acid ion, lactic acid ion, octonic acid ion, formic acid ion, salicylic acid ion, benzonic acid ion, gluconic acid ion, glutamic acid ion, glycine, alanine, ammonia, morpholine, ethylenediamine, dimethylaminoethanol, diethylaminoethanol, monoethanolamine, diethanolamine and triethanolamine.

7. Composition of claim 1 wherein synthesized resin emulsion or alkaline soluble resin are further optionally contained therein.

8. Composition of claim 1 wherein an additive or additives are further optionally contained therein.

9. Method for removing the coating formed by using the composition of claim 1 which comprises treating said coating with a ligand containing alkaline solution and removing the coating.

10. Method of claim 9 wherein the ligand is at least one selected from the group consisting of ethylenediamine tetraacetic acid, N-hydroxyethylethylenediamine-N,N',N'-triacetic acid, diethylenetriamine pentaacetic acid, N,N,N',N'-tetrakis-(2-hydroxypropyl)-ethylenediamine, ethylene-diamine-N,N'-diacetic acid, 1-hydroxyethylidene-1, 1-diphosphoric acid, triethylenetetramine-N,N',N'',N''',N''''-hexaacetic acid, cirtric acid, oxalic acid, gluconic acid, glycolic acid, malic acid, ammonia, monoethanolamine, diethanolamine, triethanolamine, morpholine, diethylaminoethanol, dimethylaminoethanol and ethylenediamine.

11. Method of claim 9 wherein the alkaline solution contains at least one selected from the group consisting of ammonia, amine, sodium hydroxide, potassium hydroxide, sodium methasilicate, sodium orthosilicate, potassium silicate, sodium pyrophosphate, potassium pyrophosphate, sodium triphosphate and sodium triphosphate as an alkaline material.

12. Method of claim 9 wherein the ligand containing alkaline solution additionally contains a surface active agent.

13. Method of claim 12 wherein said surface active agent is at least one selected from the group consisting of anionic surface active agent, nonionic surface active agent and ampholytic surface active agent.

14. Method of claim 9 wherein the ligand containing alkaline solution contains at least one selected from the group consisting of alcohols, ethers, etheralcohols and esterethers.

* * * * *